(12) United States Patent
Graumann et al.

(10) Patent No.: US 10,863,723 B2
(45) Date of Patent: Dec. 15, 2020

(54) WHEELED TRANSPORT AND SUPPORT DEVICE

(71) Applicant: GraceAnn Graumann, Carpenteria, CA (US)

(72) Inventors: GraceAnn Graumann, Carpenteria, CA (US); Hunter Davis Totemeier, Santa Barabara, CA (US); Alain Clenet, Santa Ynez, CA (US)

(73) Assignee: GraceAnn Graumann, Carpinteria, CA (US)

( * ) Notice: Subject to any disclaimer, the term of this patent is extended or adjusted under 35 U.S.C. 154(b) by 345 days.

(21) Appl. No.: 15/945,499

(22) Filed: Apr. 4, 2018

(65) Prior Publication Data

US 2019/0307105 A1    Oct. 10, 2019

(51) Int. Cl.
*A01K 27/00* (2006.01)
*A61G 7/10* (2006.01)

(52) U.S. Cl.
CPC .......... *A01K 27/002* (2013.01); *A61G 7/1046* (2013.01); *A61G 7/1017* (2013.01); *A61G 7/1051* (2013.01)

(58) Field of Classification Search
CPC .... A61D 3/00; A61G 7/1051; A61H 2203/03; A61H 3/008; A63B 2208/14
USPC ....... 119/725, 728, 417, 752, 756, 722, 724, 119/727
See application file for complete search history.

(56) References Cited

U.S. PATENT DOCUMENTS

| | | | |
|---|---|---|---|
| 6,575,483 B1 * | 6/2003 | Davis | B62B 1/208 280/47.35 |
| 9,339,012 B2 * | 5/2016 | McClain | A01K 27/002 |
| 2004/0231613 A1 * | 11/2004 | Parkes | A01K 15/00 119/727 |
| 2016/0242392 A1 * | 8/2016 | Holzworth | A01K 29/00 |

* cited by examiner

*Primary Examiner* — Peter M Poon
*Assistant Examiner* — Jeffrey R Larsen
(74) *Attorney, Agent, or Firm* — Felix L. Fischer

(57) ABSTRACT

An invalid dog lift and support device employs a lever mounted on spread wheels supported by retractable legs with a tanslatable harness mount received on the lever. A telescoping handle is received in an end of the lever distal from the legs. The harness mount is rotatable to position a dog, supported in harnesses suspended form the harness mount, parallel to or transvers to the lever. The harness mount is translatable on the lever from a position proximate the legs to a position distal from the legs.

3 Claims, 20 Drawing Sheets

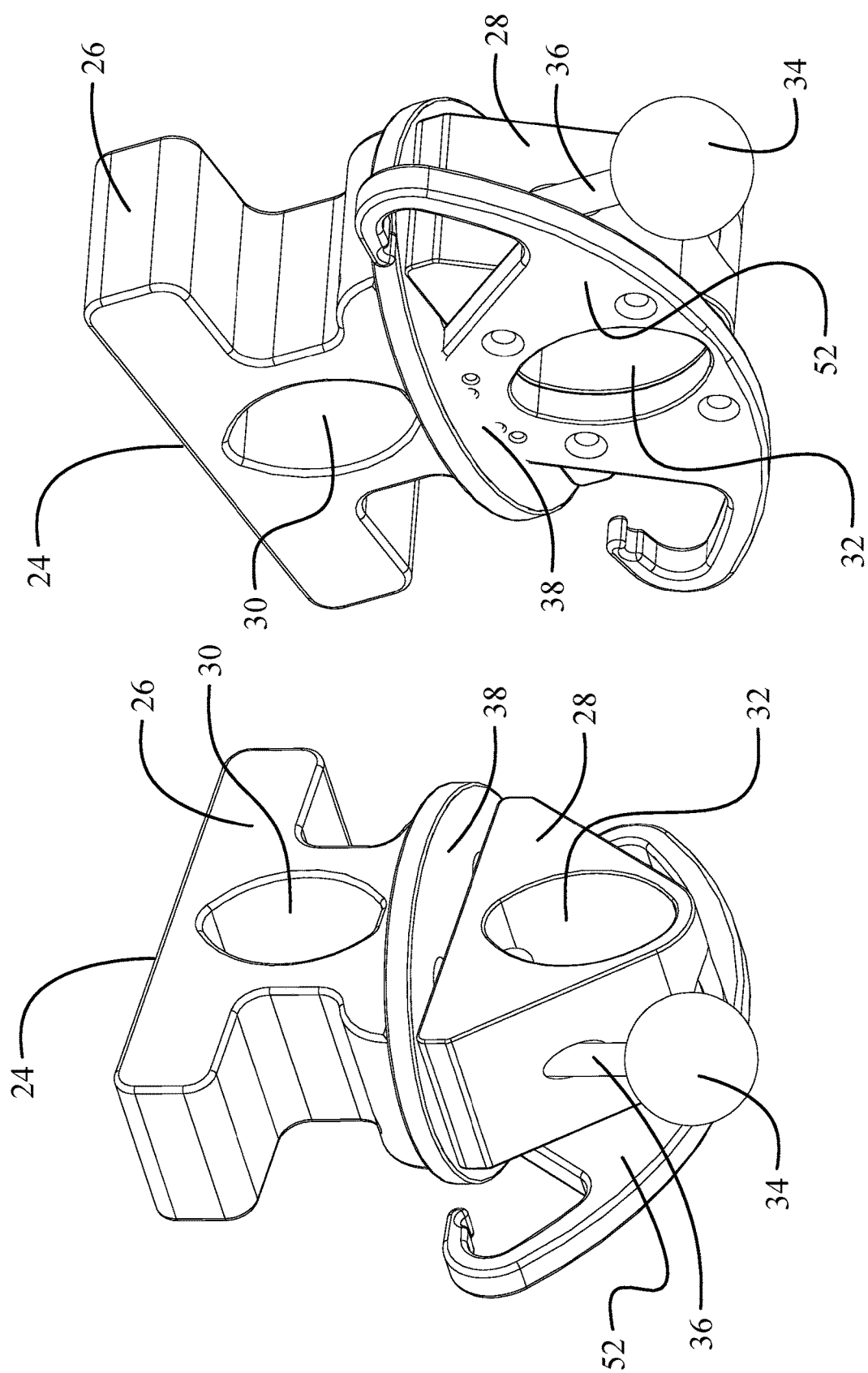

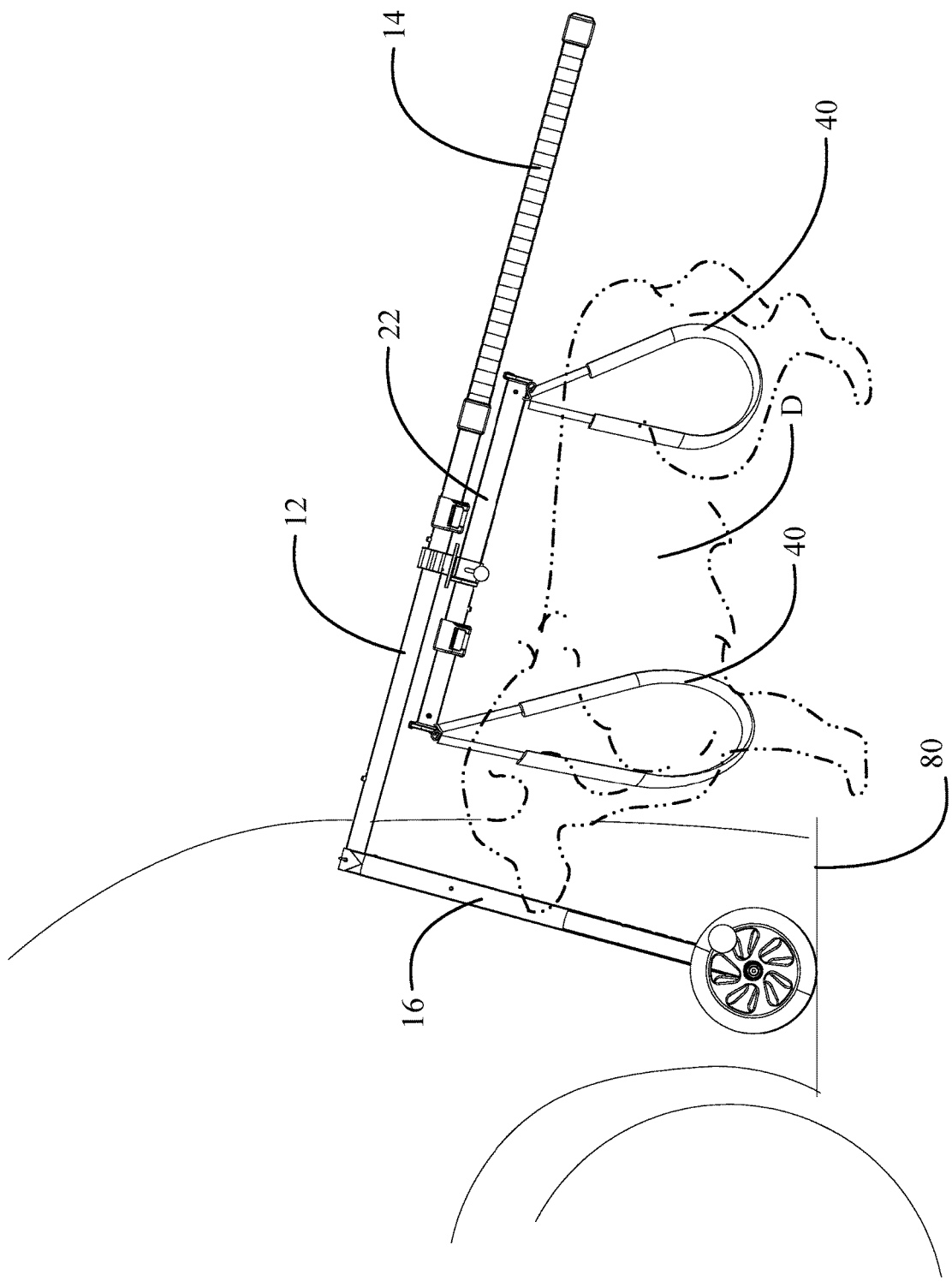

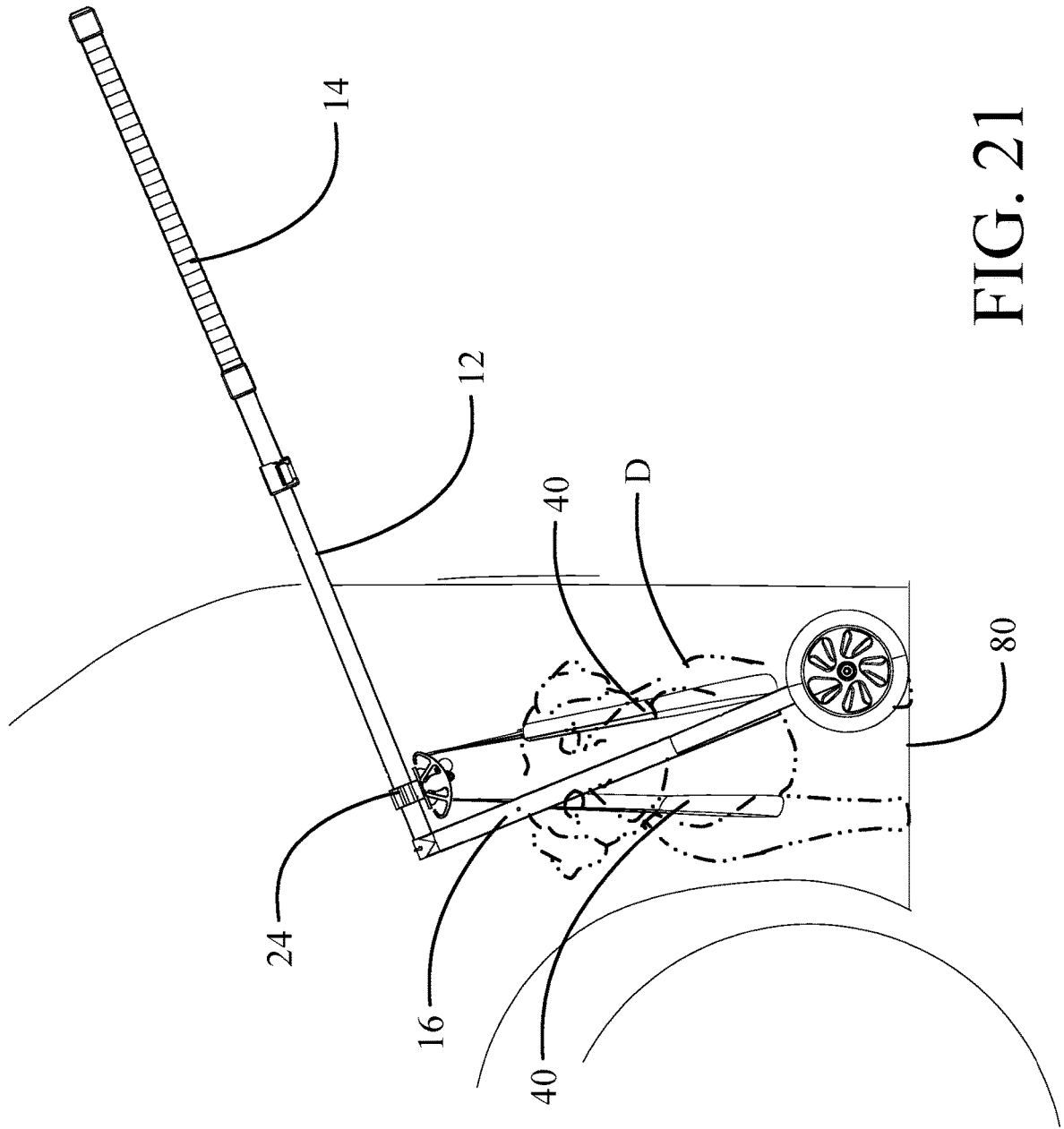

WHEELED TRANSPORT AND SUPPORT DEVICE

BACKGROUND

Field

This invention relates generally to the field of invalid dog support and more particularly to a device providing a wheeled transport device with an adjustable harness support structure with a lever arm for operation.

Description of the Related Art

Dogs are living much longer and often become disabled due to aging, injuries, post surgery conditions and other conditions. A dog with such conditions may live a happy life and owners are much less likely to euthanize a dog if appropriate assistance for walking the dog and generally supporting/lifting the dog for everyday tasks. The additional life span, however, may require senior health care equipment for pets similar to aging humans needing health care and support equipment. Numerous "wheel chair" or "stroller" type apparatus are available but are typically limited for use with smaller dogs.

It is therefore desirable to provide a device which allows support of an invalid dog with convenient operational features for the user.

SUMMARY

The embodiments disclosed herein overcome the shortcomings of the prior art by providing a lever mounted on spread wheels supported by retractable legs with a translatable harness mount received on the lever. A telescoping handle is received in an end of the lever distal from the legs. The harness mount is rotatable to position a dog supported in a harness parallel to or transvers to the lever. The harness mount is translatable on the lever from a position proximate the legs to a position distal from the legs.

BRIEF DESCRIPTION OF THE DRAWINGS

These and other features and advantages of the present invention will be better understood by reference to the following detailed description of exemplary embodiments when considered in connection with the accompanying drawings wherein:

FIG. 5 is a lower rearward perspective of the mounting assembly;

FIG. 6 is a lower forward perspective of the mounting assembly;

FIG. 20 is a side representation of the exemplary implementation as employed for lifting the dog into a vehicle; and, FIG. 21 is a side representation of the exemplary implementation with the harness mount rotated for insertion of the dog in the vehicle.

DETAILED DESCRIPTION

Figure 1:
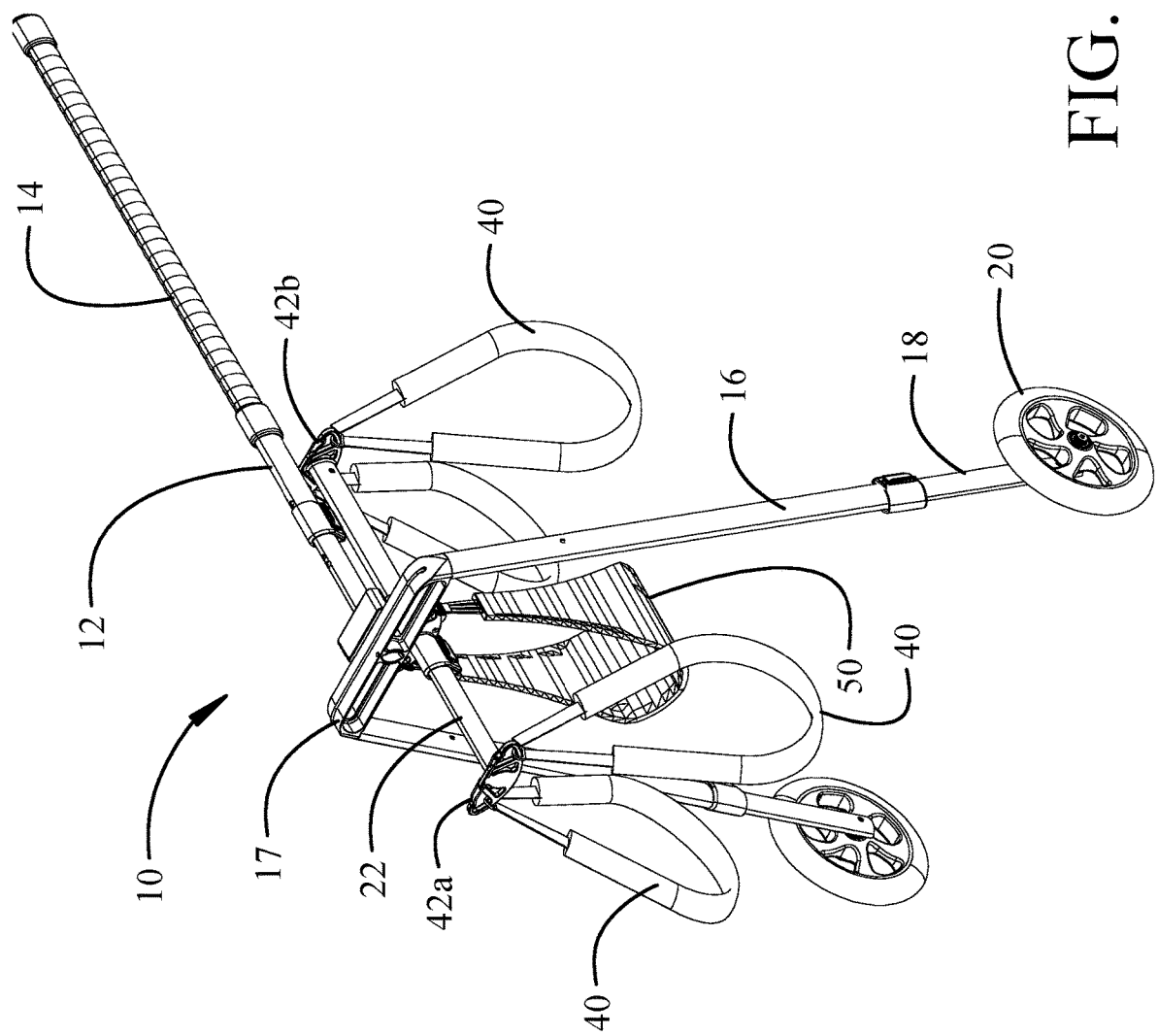
FIG. 1 is a front perspective representation of a first implementation of the dog lift and support device.

Implementations shown in the drawings and described herein provide an invalid dog lift and support device incorporating a lever supported by retractable legs terminating in wheels with a translatable harness mount engaged to the lever. A dog is supportable by a plurality of harness elements suspended from the harness mount. A telescoping handle is received in an end of the lever distal from the legs. In a first implementation, the harness mount is rotatable to position a dog, supported in a plurality of harness elements suspended from the harness mount, parallel to or transvers to the lever. The harness mount is translatable with respect to the lever from a position centered proximate the legs to a position centered distal from the legs to alter the center of gravity of the dog with respect to the legs.

In a second implementation, the lever is translatable within a head supporting the legs. The plurality of harness elements are mounted directly to the lever allowing the center of gravity of the dog with respect to the legs to be altered by translation of the lever in the head.

Figure 2:
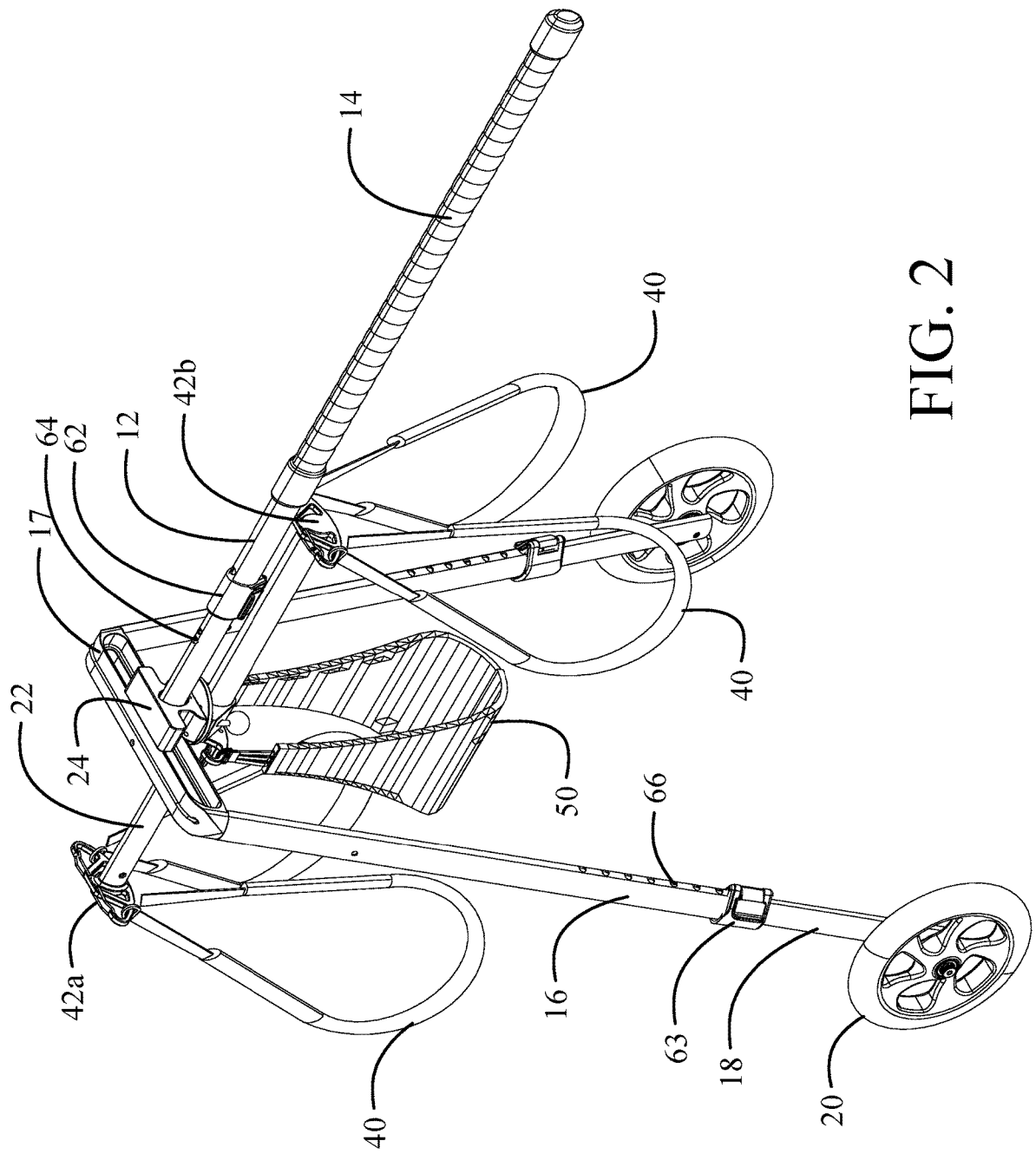
FIG. 2 is a rear perspective representation of the first implementation.

Referring to the drawings, the FIGS. 1 and 2 the invalid dog lift and support device 10 has a lever 12 with an extendible telescoping handle 14. Canted legs 16 are removably mounted to a head 17 attached to a first end of the lever 12 and terminate in a collapsible portion 18 supporting wheels 20. The legs may be substantially straight as shown in the drawings or may have multiple angled elements. Mounting of the legs to the lever 12 is accomplished to be collapsible or removable, as will be described subsequently. A harness mount 22 is translatably engaged to the lever 12.

Figure 3:
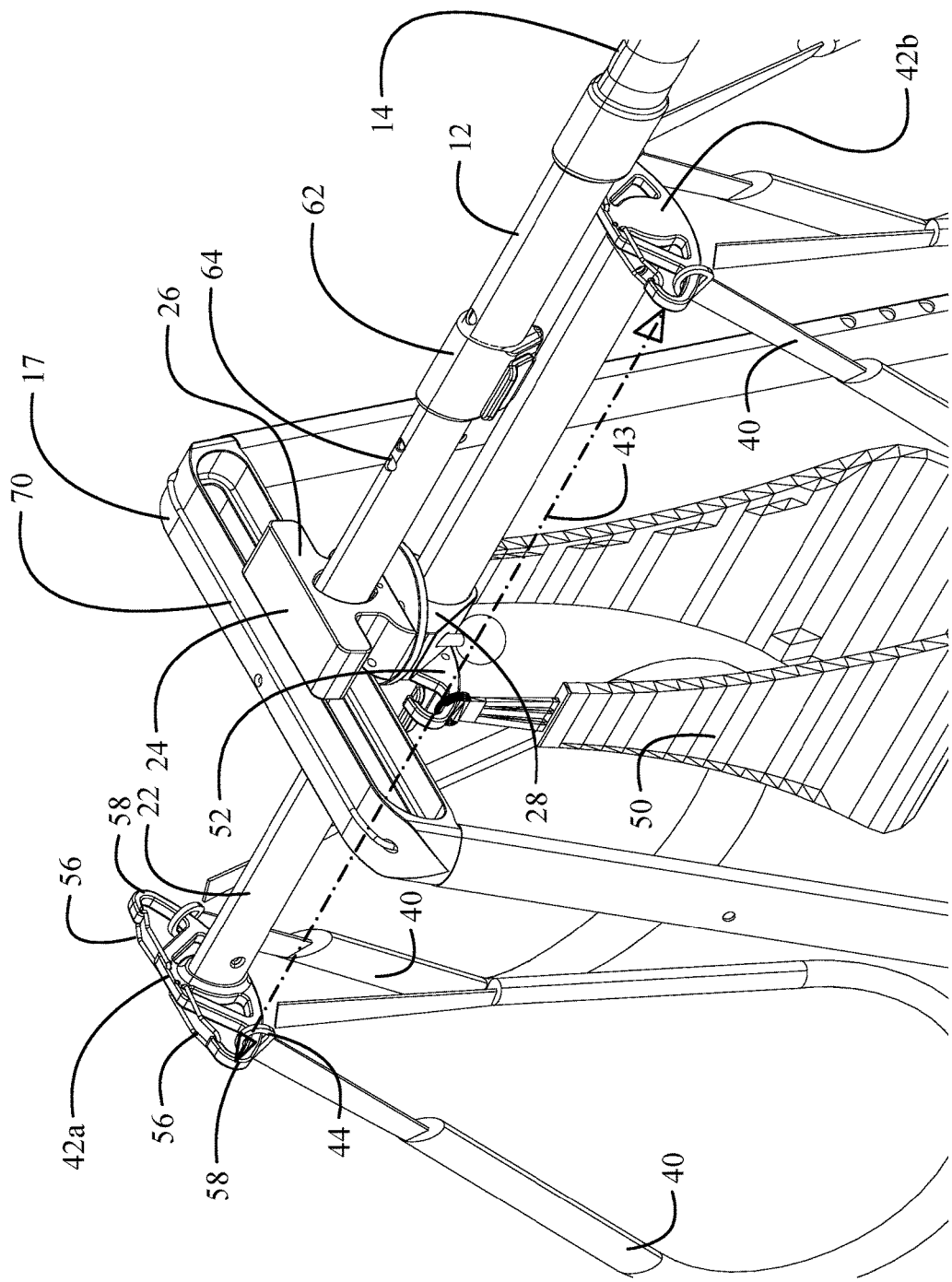
FIG. 3 is a detailed upper rear perspective representation showing the head and harness mount assembly.
Figure 4:
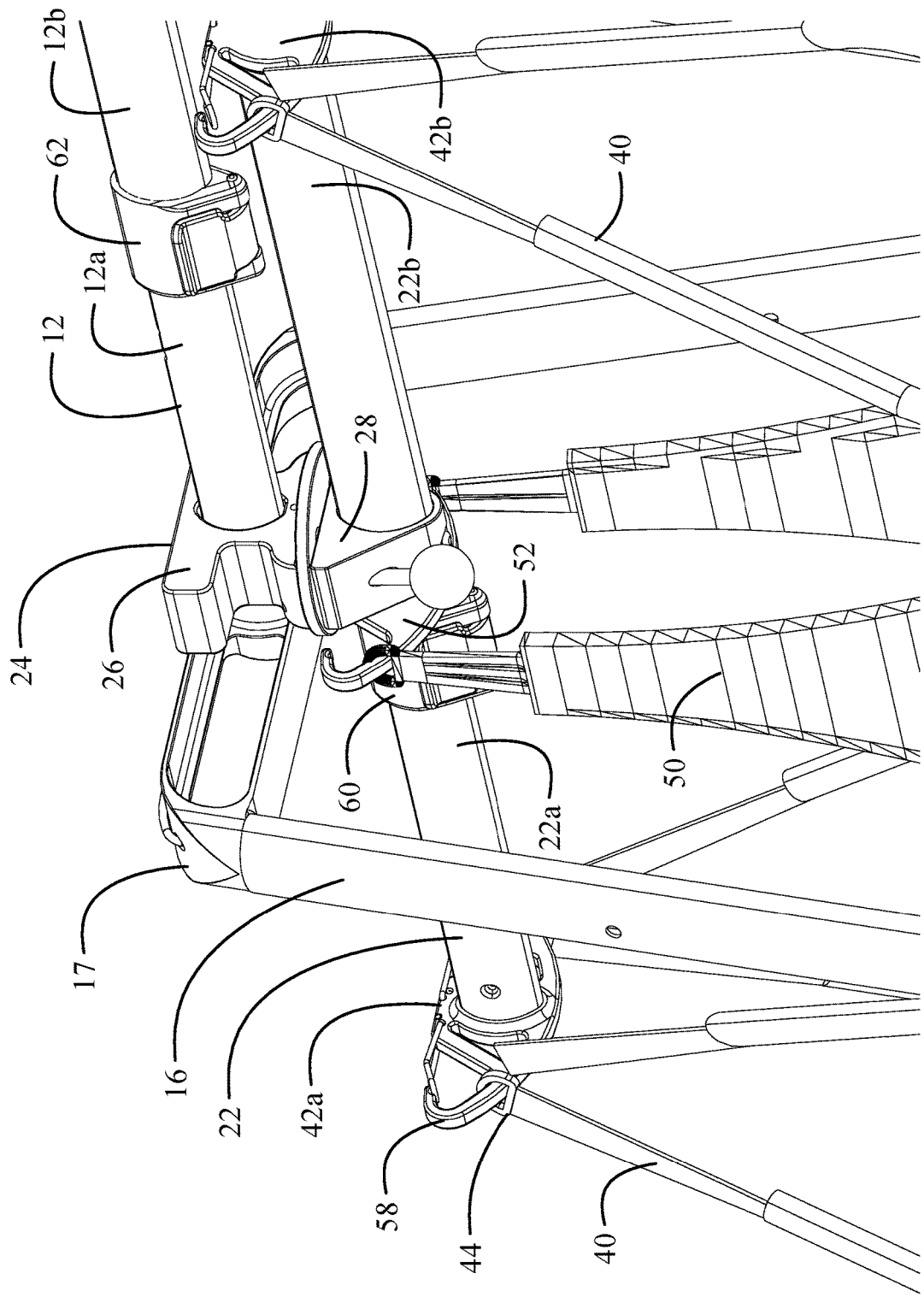
FIG. 4 is a detailed lower rear perspective representation showing the head and harness mount assembly.
Figure 7:
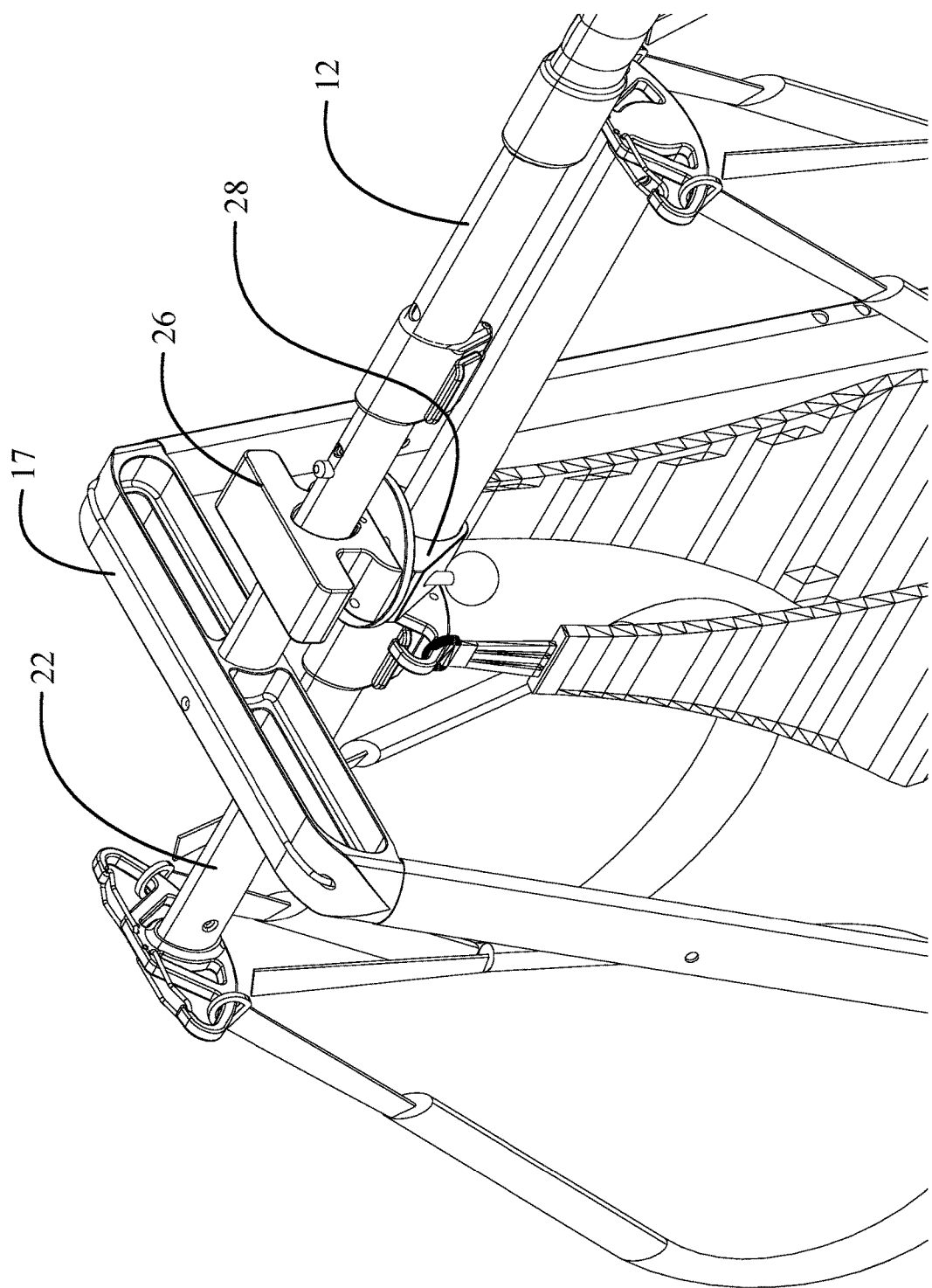
FIG. 7 is an upper reward perspective detail view showing the harness mount translated rearward.
Figure 8:
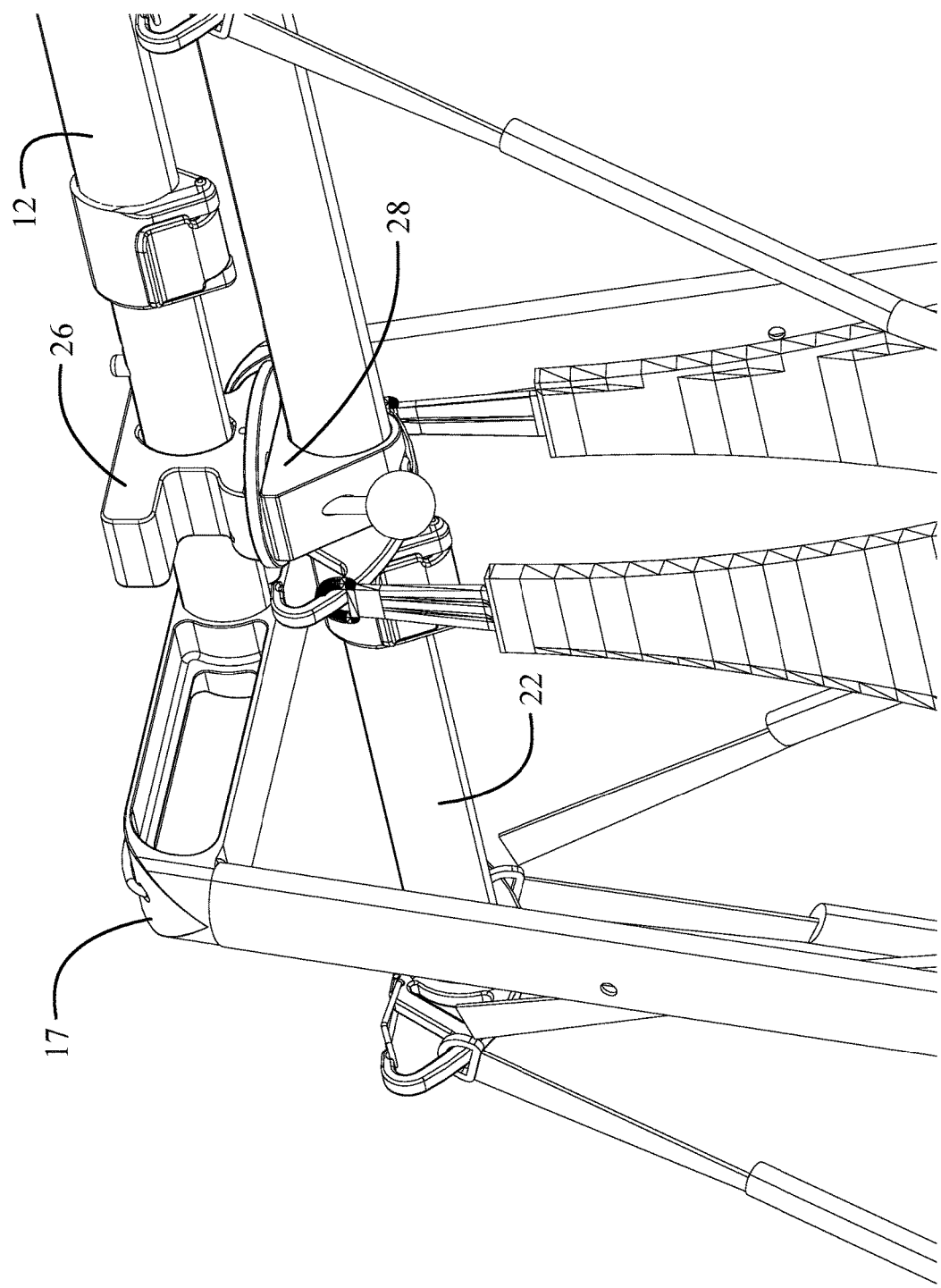
FIG. 8 is a lower reward perspective detail view showing the harness mount translated rearward.
Figure 9:
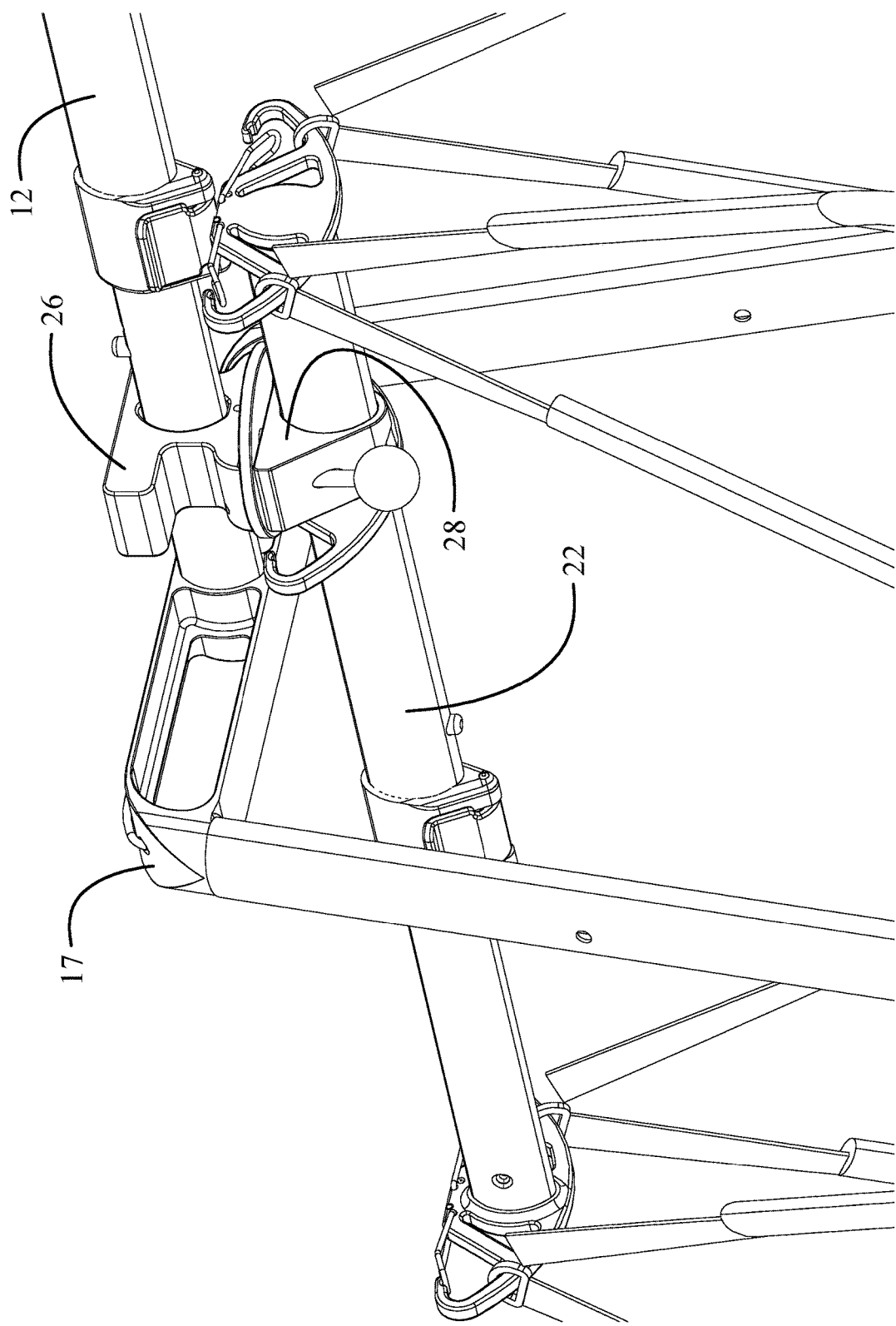
FIG. 9 is a lower reward perspective detail view showing the harness mount translated forward.

As seen in detail in FIGS. 3 and 4, the harness mount 22 is received through a mounting assembly 24 supported on the lever 12. For the implementation shown, the mounting assembly 24 includes a boss 26 through which the lever 12 is connected to the head 17. Harness mount 22 is received in a rotatable support block 28. Details of the mounting assembly 24 are seen in FIGS. 5 and 6. The boss 26 has an aperture 30 through which the lever 12 is received for engagement to the head 17. The harness mount 22 is received in an aperture 32 in the support block 28. Translation of the harness mount 22 may be accomplished either by sliding the boss 26 along the lever 12 received in aperture 30 or by sliding the harness mount 22 through aperture 32 in the support block 28. Apertures 30 or 32 may be lined with a lubricious material such as Teflon® or incorporate bearings for ease of translation of the harness mount 22. In certain implementations translation of both the boss 26 on the lever 12 and harness mount 22 in the support block 28 for optimizing the relative positioning of the harness mount 22 may be employed. In alternative implementations, the boss 26 may be fixedly engaged to the lever 12 or head 17, or the harness mount 22 may be fixed within the support block 28. An adjustment of both elements rearwardly is shown in FIGS. 7 and 8. An exaggerated translation of the harness mount forward is shown in FIG. 9 (center harness removed for clarity). Translation of the harness mount 22 in the mounting assembly 24 allows positioning of the center of gravity of the supported dog with respect to the head 17 to allow adjustment of the leverage applied by the handle 14.

Figure 10:
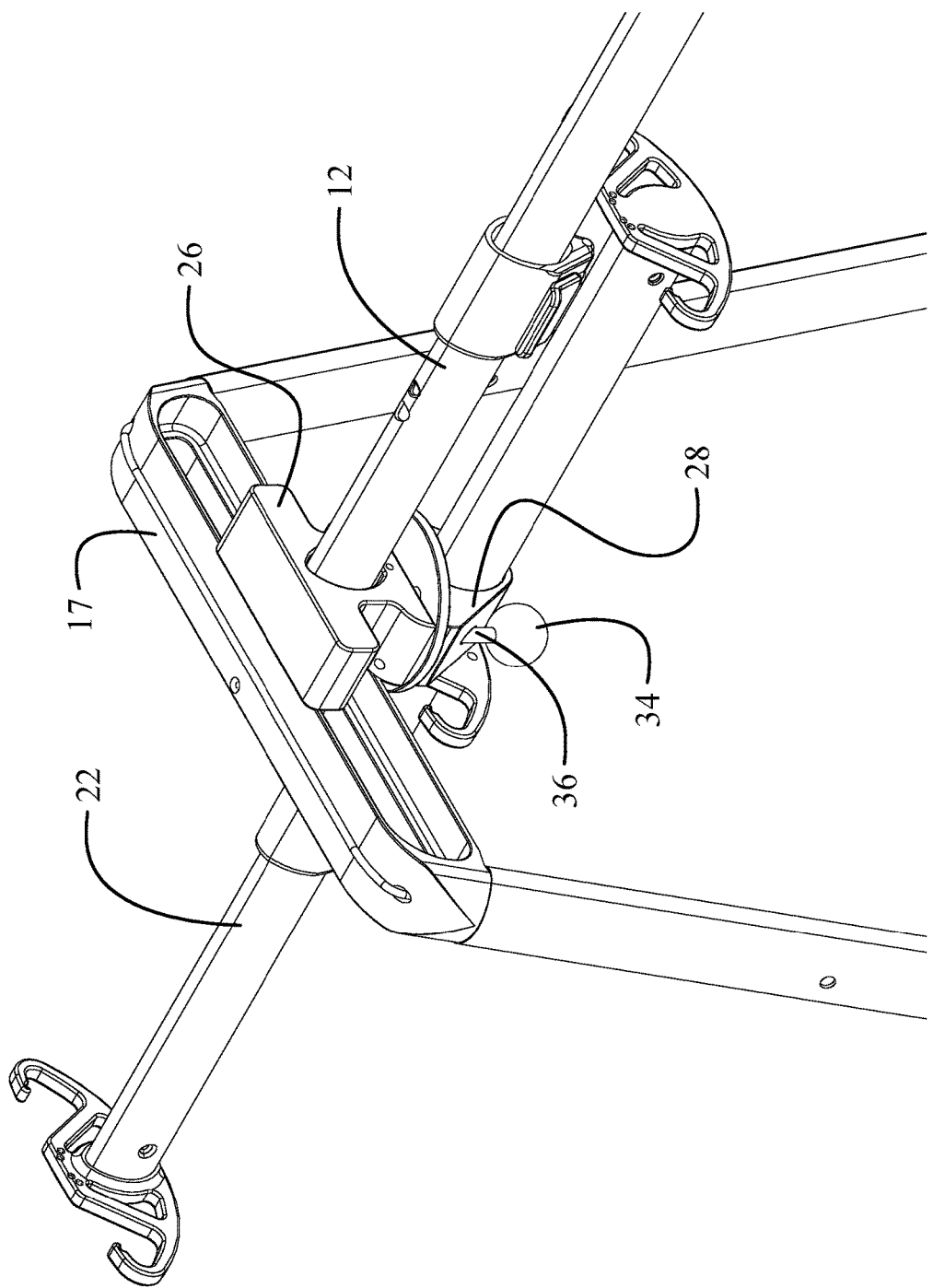
FIG. 10 is an upper reward perspective detail view showing the harness mount translated forward.
Figure 11:
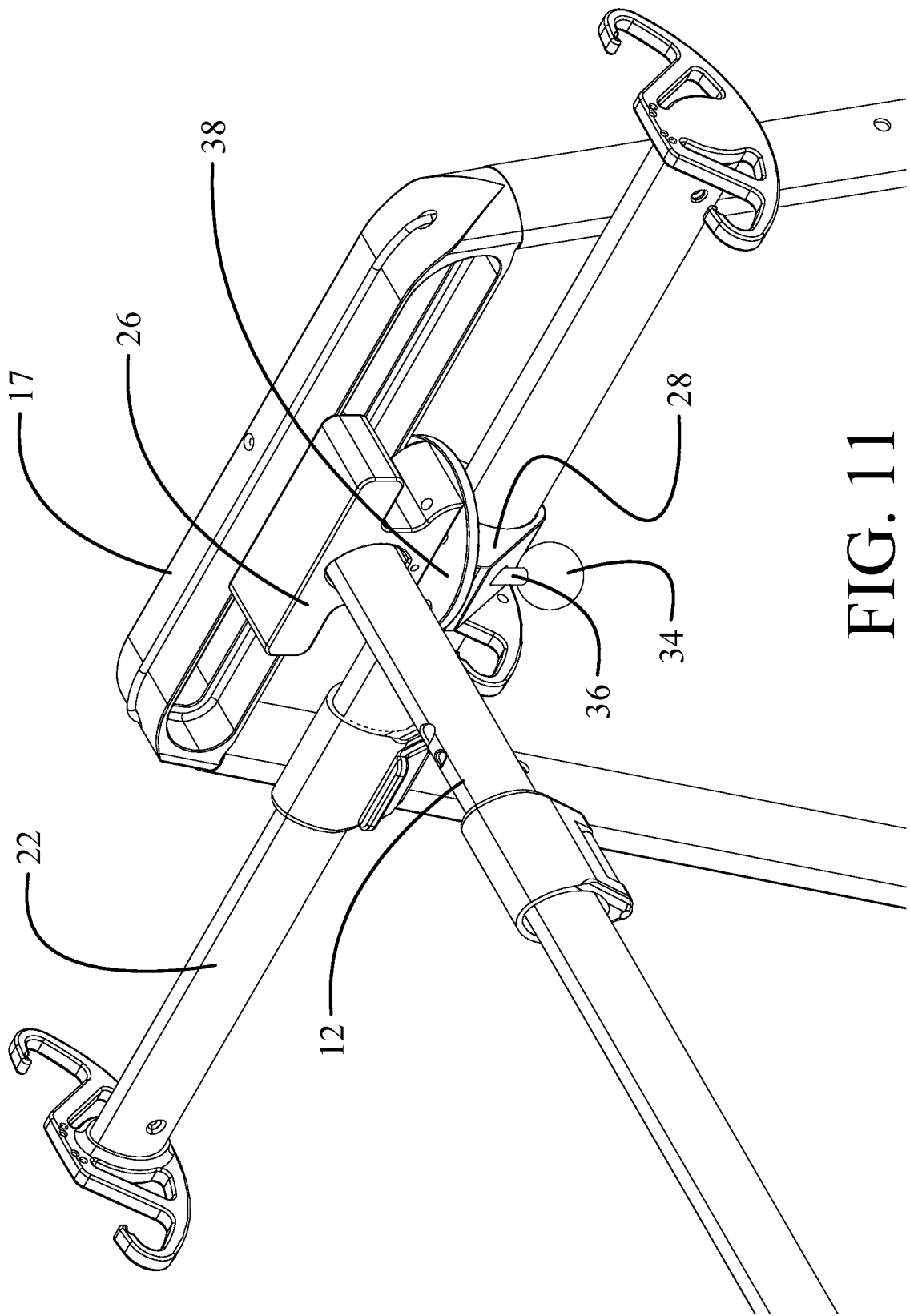
FIG. 11 is an upper rearward perspective detail showing the harness mount rotated to a transverse position.

For the exemplary implementation, the support block 28 is rotatable in the mounting assembly 24. A lock release nob 34 is employed to secure the support block 28 placing the harness mount 22 in a desired position parallel to the lever 12, as seen in FIG. 10 (all harnesses removed for clarity), or perpendicular to the lever as seen in FIG. 11. The lock release nob 34 may incorporate a pin 36 received in detents in a rotation plate 38.

Figure 12:
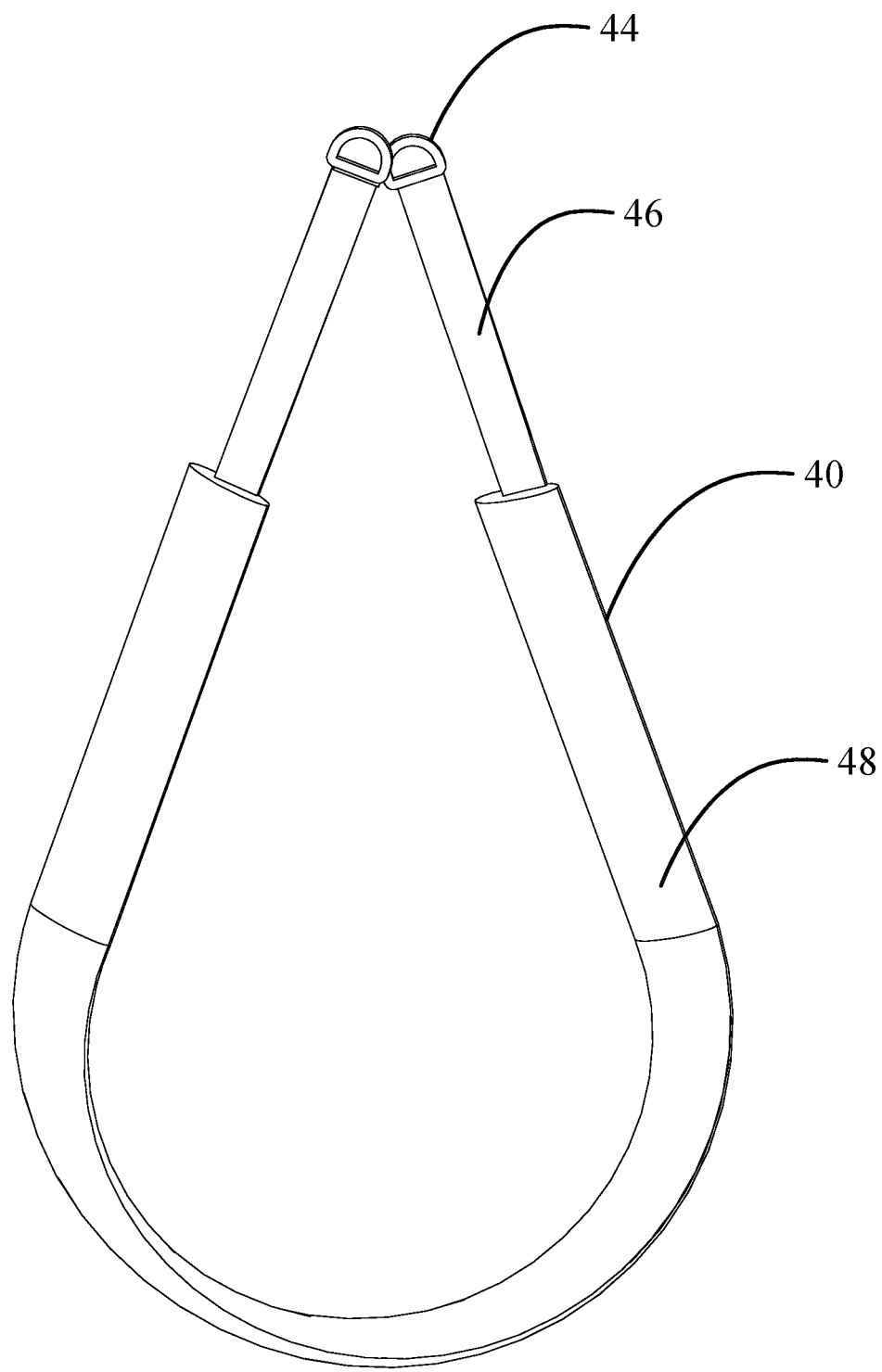
FIG. 12 is a perspective representation of an exemplary leg harness.

Returning to FIGS. 1-4, as will be described subsequently, the dog is supported from the harness mount 22 with various harness elements. Leg harnesses 40 for both the front and rear legs are suspended from hangers 42a, at a forward end of the harness mount 22, and 42b, at a rearward end of the harness mount 22. In one exemplary implementation seen in FIG. 12, each leg harness 40 incorporates D-rings 44 on the ends of straps 46 allowing the straps (and harnesses) to swivel to be rotatably suspended on the hangers 42a, 42b. Alternative rotatable fittings such a circular rings may be employed. Pads 48 either surround or may be integral to the straps 46 for comfort. An abdominal or center harness 50 may be optionally employed and suspended from a central hanger 52. The pad 54 on the central harness 50 may be elongated to provide additional support and comfort and may include flaps to surround the body of the dog, removably secured with hook and loop fasteners or similar means. The central hanger 52 may be mounted to the support block 28 of the mounting assembly 24 as shown in the drawings or may alternatively be either fixed or translatably received on the harness mount 22. As best seen in FIG. 3, the hangars, such as hanger 42a, may incorporate resiliently deformable or locking bales 56 to secure the D-rings 44 on hooks 58.

The harness mount 22 is adjustable in length for positioning the strap hangers 42a, 42b spaced at a predetermined length 43 (seen in FIG. 3) equal to the length of the dog's back for the dog to be comfortably suspended. This, with the rotatable suspension of the harnesses from the hangers additionally allows substantially vertical suspension of the leg harnesses 40, regardless of the angle of the lever 12 and handle 14, resulting in even support under the "arm pits" and hip joints with resulting substantially vertical reactive forces similar to a crutch. For the exemplary implementation, harness mount 22 employs two telescoping elements 22a, 22b which are selectably locked in place at a length determined by the length of the dog's back by a clamp 60 as seen in FIG. 4. Similarly, the lever 12 may have telescoping sections 12a, 12b selectably locked in place at a length determined by desired effective leverage by a second clamp 62. For the exemplary implementation, the lever 12 and harness mount 22 are fabricated with tubing, preferably aluminum, having an ellipsoidal cross section with the major axis oriented vertically to provide enhanced structural strength. In alternative embodiments other cross sections such as round, quadrilateral or hexagonal may be employed.

Handle 14 is telescopically received in lever 12 and constrained by a clamp 62 with detents 64 as seen in FIGS. 1 and 2. Similarly, collapsible portion 18 in each leg 16 is adjustable for height using a clamp 63 in multiple detents 66. In alternative implementations, resilient buttons received in the detents or similar constraining elements may be employed.

Figure 13:
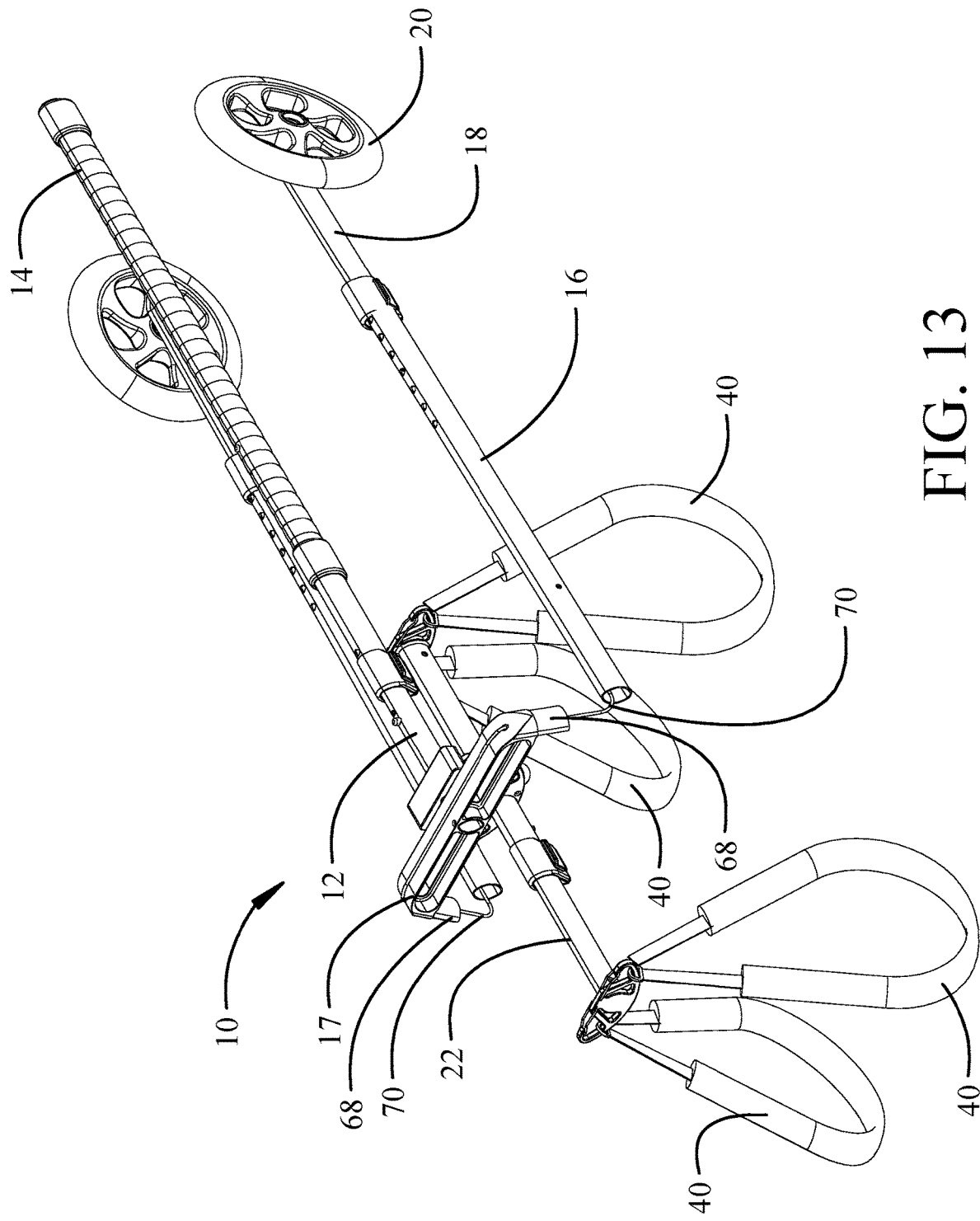
FIG. 13 is a detailed perspective representation of the head with the legs removed for transport/storage.
Figure 14:
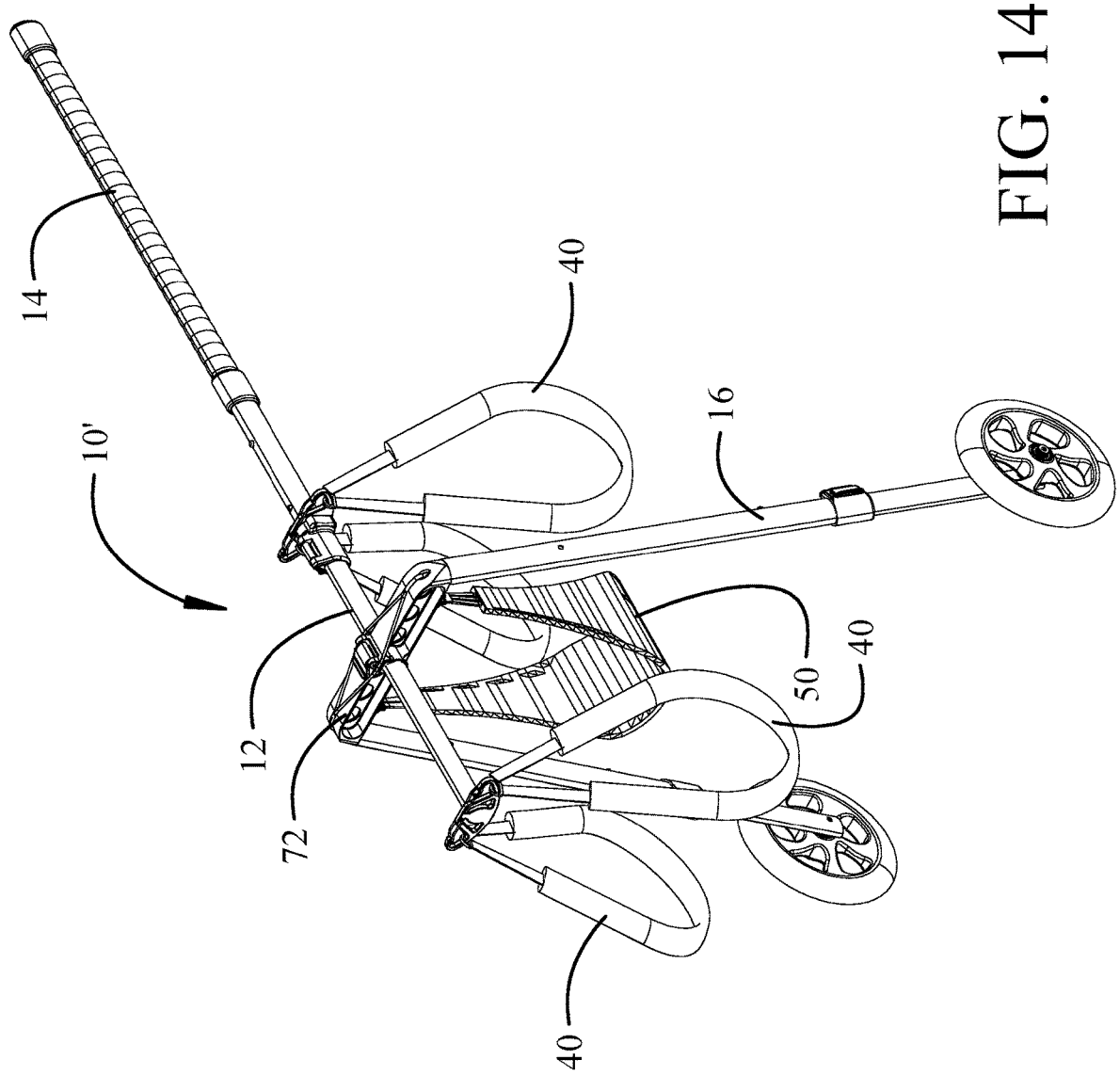
FIG. 14 is a upper forward perspective representation of a second implementation.
Figure 15:
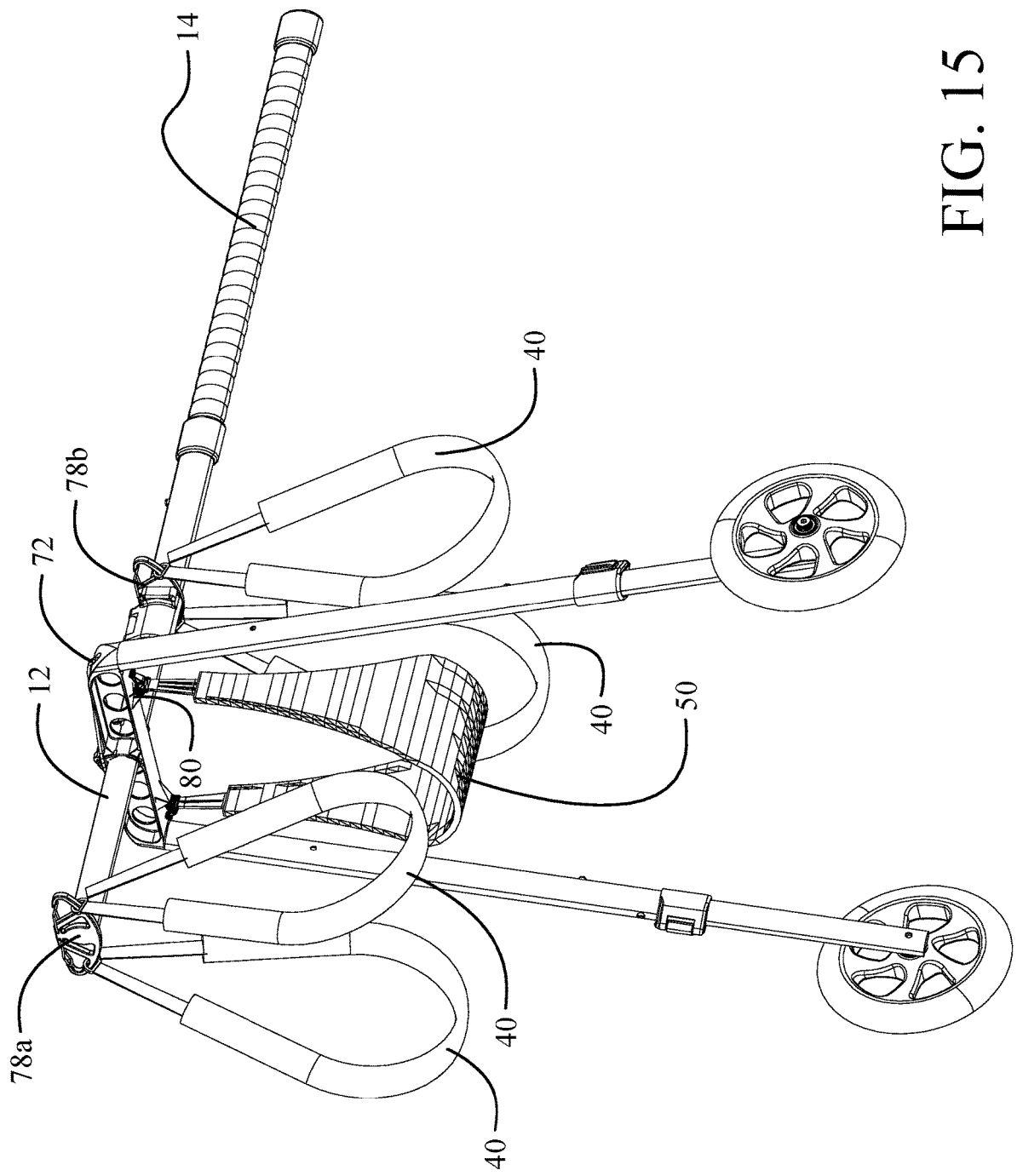
FIG. 15 is a lower forward perspective representation of the second implementation.
Figure 16:
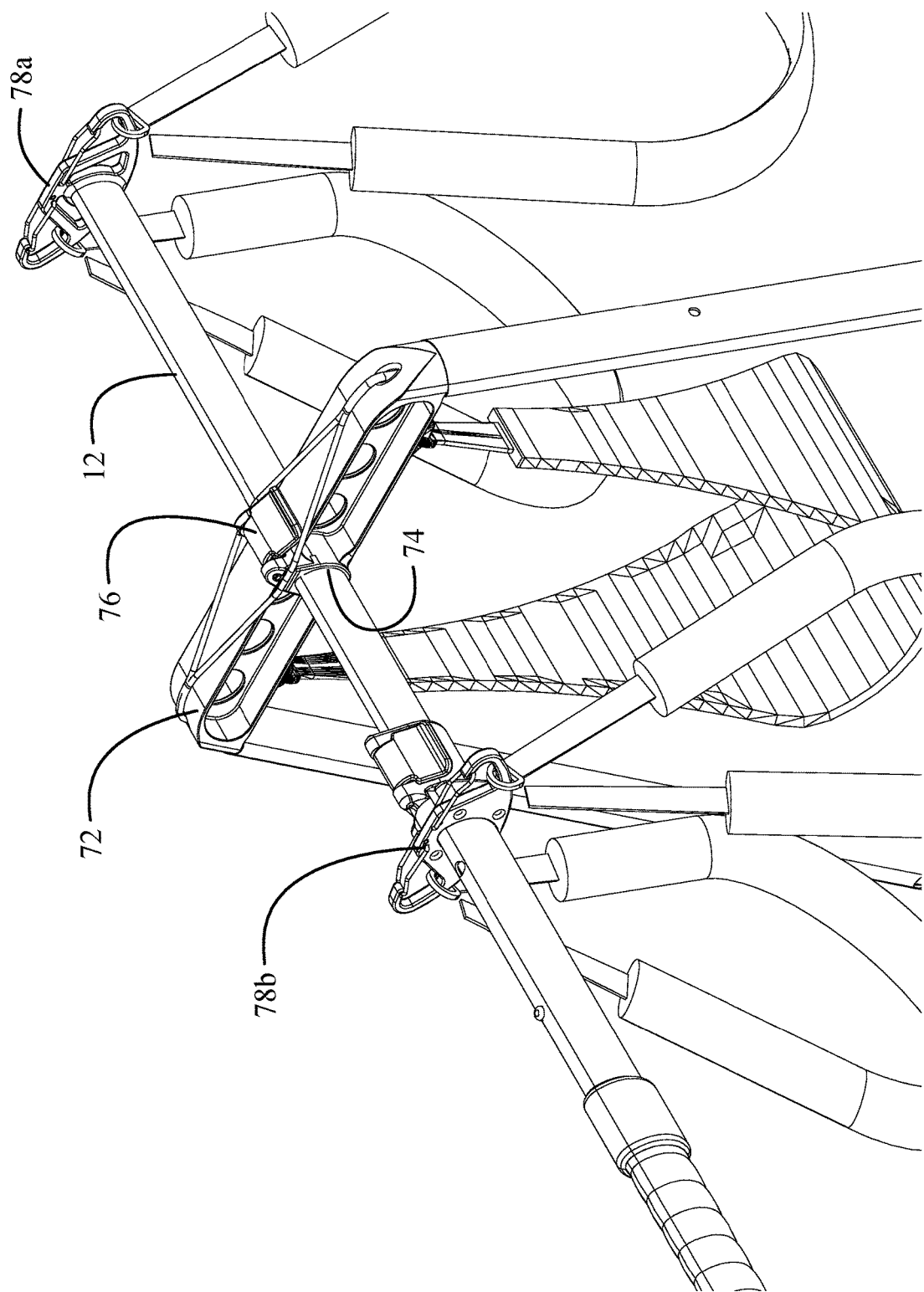
FIG. 16 is a detailed upper rearward perspective representation of the second implementation showing the head and strap hangers.
Figure 17:
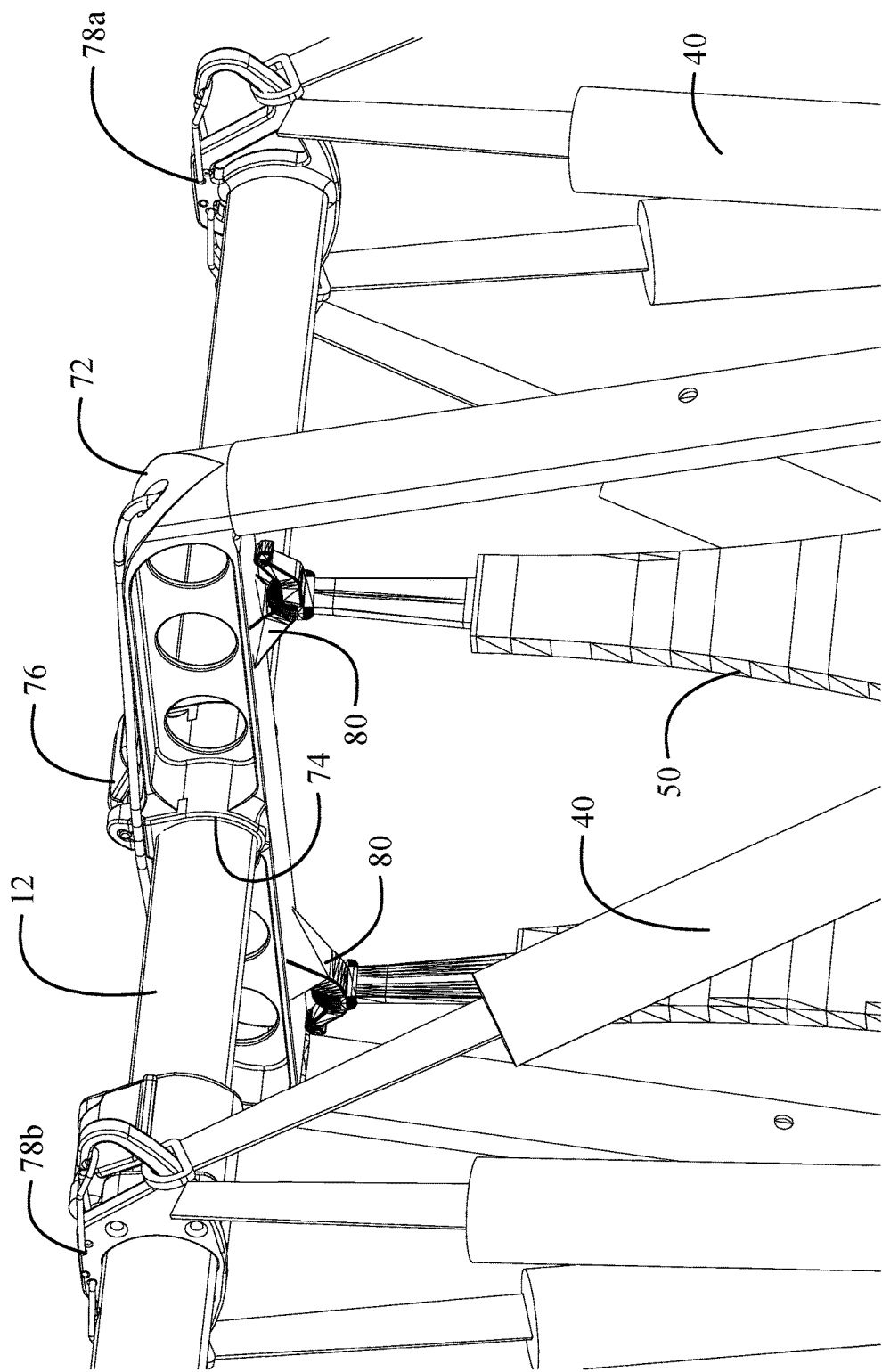
FIG. 17 is a detailed lower rearward perspective representation showing the abdominal harness attachment.

As seen in FIG. 13, the legs 16 are removably received on stubs 68 angularly extending from the head 17. The exemplary implementation employs a bungee 70 or similar resilient element to urge the legs 16 into contact with stubs 68 in the assembled condition while allowing removal of the legs 16 from the stubs 68 for collapsible storage. The bungee 70 constrains the legs 16 when disassembled to avoid separation.

A second implementation of the dog lift and support device 10' is shown in FIGS. 14-17. The second implementation is provided with a head 72 which receives the lever 12 for longitudinal translation through an aperture 74. A restraining clamp 76 fixes the lever at the desired position in the head 72. A forward strap hanger 78a and rearward strap hanger 78b are fixed to the lever 12 at a head end and tail end, respectively, to support leg harnesses 40 as described for the first implementation. Center harness 50 is attachable to laterally displaced hooks 80 depending from the head 72 (best seen in FIG. 17). Translation of the lever 12 in the head 72 allows positioning of the center of gravity of the supported dog with respect to the head 72 to allow adjustment of the leverage applied by the handle 14.

Figure 18:
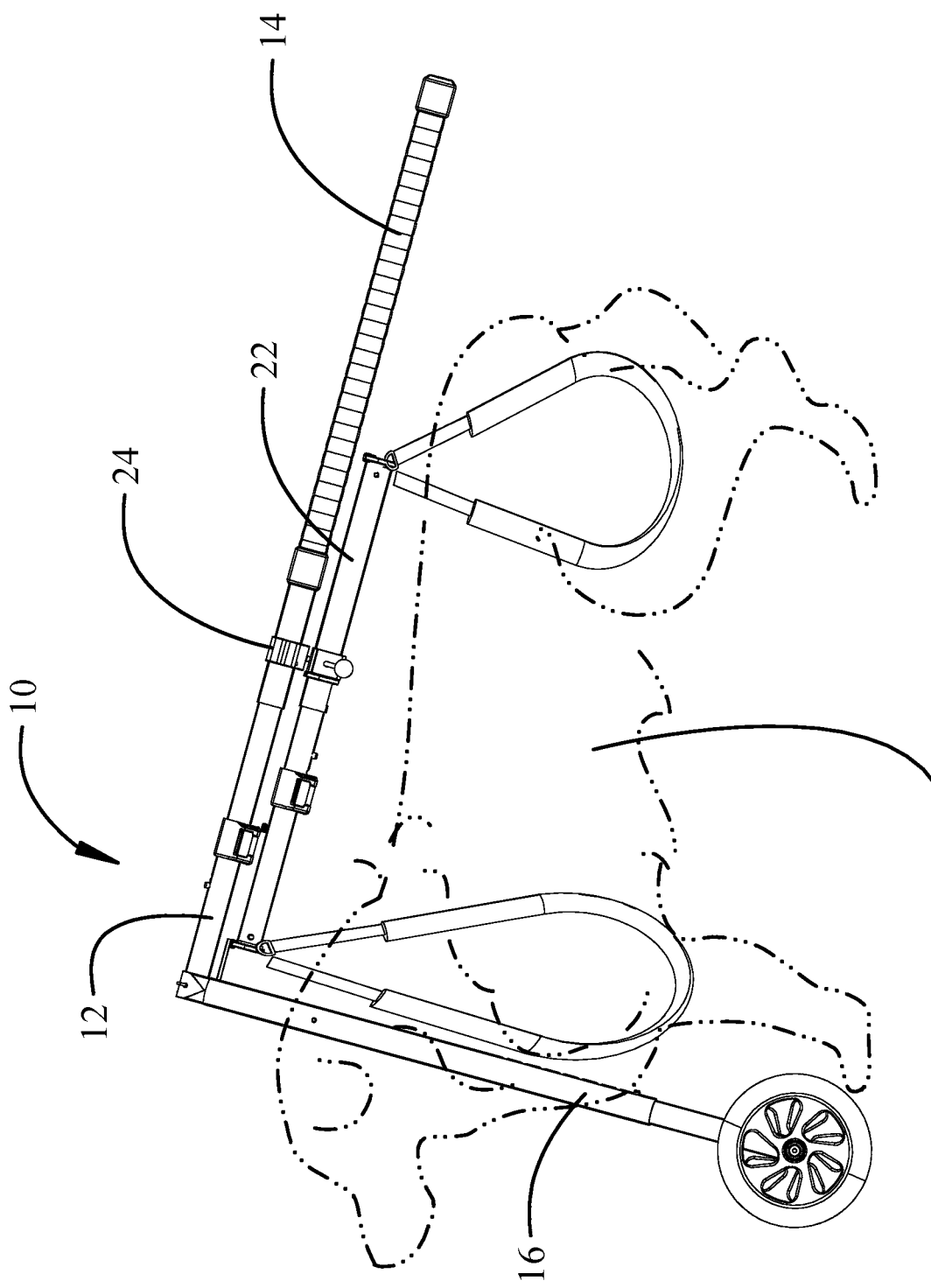
FIG. 18 is a side representation of an exemplary implementation with a dog supported.
Figure 19:
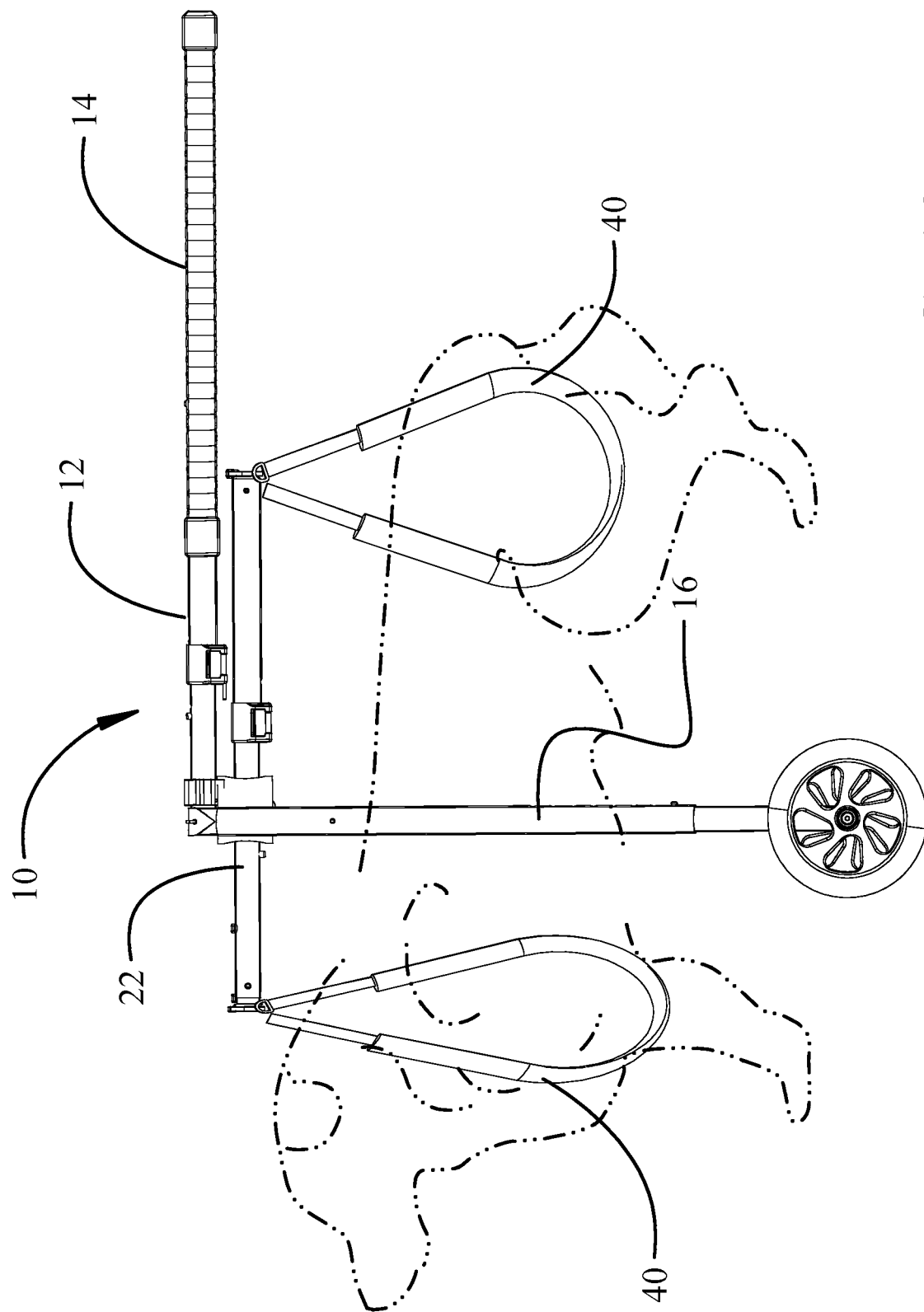
FIG. 19 is a side representation of the exemplary implementation with the dog elevated.

As seen in FIG. 18, a dog D (shown in phantom) is supported with harness elements which may include the legs harnesses 40 and center harness 50 previously described. Positioning of the harness mount 22 or lever 12 with respect to the head 17, 72 allows varying the location of the center of gravity of the dog. Pivoting suspension of the leg harnesses 40 by the D-rings and spacing of the harnesses by the harness mount 22 allows vertical suspension from the harness mount 22 as previously described. If the dog is ambulatory, the lever may be canted downward with the handle 14 extended or retracted to a length further adjusting desired leverage to support the dog. As seen in FIG. 19, if the dog is not ambulatory, the lever may be elevated and the harness mount 22 (or lever 12 in the second implementation) moved forward to place the center of gravity of the dog essentially in alignment with the wheel legs 16. The dog will be elevated and supported by the harness elements. Again the pivoting suspension of the leg harnesses 40 by the D-rings allows vertical suspension from the harness mount 22.

The device 10 is also adapted to allow loading the dog into a vehicle as seen in FIGS. 20 and 21. As shown in FIG. 20, the collapsible portions 18 of the legs are telescopically collapsed and the device is angled to place the wheels into the rear of the vehicle 80. The handle is then lifted to elevate the lever 12 and the harness mount 22 is then moved to toward the end of the lever. The support block and harness mount may be rotated to place the dog transverse to the lever as seen in FIG. 21.

The tilting of the lever 12 with the handle 14 allows the harness mount 22 to naturally slide into the vehicle with the dog suspended from the harnesses. Control of the sliding motion may be accomplished both by gripping the boss 26 on the mounting assembly 24 and the angle induced by elevating the handle 14. Rotation of the support block 28 may be accomplished before elevating the handle 14.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A wheeled transport device comprising:
   a head having an aperture;
   canted legs mounted to the head and terminating in supporting wheels;
   a lever received through the aperture in the head;
   a restraining clamp fixing the lever in the aperture in the head at a selected position in a range of positions;
   a forward strap hanger fixed to the lever at a head end;
   a rearward strap hanger fixed to the lever at a tail end, wherein the forward strap hanger and rear strap hanger further comprise resiliently deformable or locking bales on hooks; and,
   a handle telescopically received in the lever.

2. The wheeled transport device as defined in claim 1 wherein the telescoping handle is selectably locked on the lever with a clamp.

3. The wheeled transport device as defined in claim 1 wherein the canted legs are retractable and removably received on stubs angularly extending from the head.

\* \* \* \* \*